United States Patent [19]

Syrop et al.

[11] 3,980,579

[45] Sept. 14, 1976

[54] CATALYTICALLY STABLE HALOGENATED POLYOL COMPOSITION

[75] Inventors: Allan H. Syrop, Hamden; Peter P. Priga, Derby, both of Conn.

[73] Assignee: Olin Corporation, New Haven, Conn.

[22] Filed: Oct. 18, 1974

[21] Appl. No.: 516,023

[52] U.S. Cl. .......................... 252/182; 260/2.5 AB; 260/2.5 AC; 260/2.5 BB; 260/429.7
[51] Int. Cl.² .................... C08G 18/24; B01J 23/14
[58] Field of Search ................ 252/182, 431 R, 438; 260/2.5 AB, 2.5 AC, 2.5 BB, 45.75 K, 429.7

[56] References Cited
UNITED STATES PATENTS

| | | |
|---|---|---|
| 3,392,128 | 7/1968 | Hostettler et al. ............. 260/2.5 AB |
| 3,392,153 | 7/1968 | Hostettler et al. ............. 260/2.5 AB |
| 3,582,501 | 6/1971 | Hostettler et al. ............. 260/2.5 AB |
| 3,645,927 | 2/1972 | Andres et al. ................. 260/2.5 AB |
| 3,703,489 | 11/1972 | Morehouse .................... 260/2.5 AB |
| 3,817,882 | 6/1974 | Hostettler et al. ............. 260/2.5 AB |

*Primary Examiner*—Benjamin R. Padgett
*Assistant Examiner*—Irwin Gluck
*Attorney, Agent, or Firm*—F. A. Iskander; T. P. O'Day

[57] ABSTRACT

A catalytically stabilized polyol composition, for use in the preparation of polyurethane foam, is disclosed which comprises a halogen-containing polyol, an amine catalyst and a sulfur-containing organotin compound.

17 Claims, No Drawings

CATALYTICALLY STABLE HALOGENATED POLYOL COMPOSITION

This invention relates to the stabilization of tertiary amines when these are used as catalysts, in a composition comprised of a halogenated polyol, for the production of polyurethane foam.

Polyurethane foam is generally prepared by reacting an organic polyisocyanate with a polyol in the presence of a foaming agent and a reaction catalyst. Although a variety of catalysts have been disclosed in the art for promoting this type of reaction, the most widely and successfully used catalysts are the aliphatic and cycloaliphatic amines including mixtures thereof with selected metal salts such as stannous octoate.

It is also known in this art that polyurethanes derived from halogenated polyols exhibit varying degrees of resistance to burning; and in view of the increasing demand for flame retardant polyurethane foam, numerous halogenated polyol compositions have been developed for use by the polyurethane industry. Illustrative of these are polyether polyols which contain two or more halogens substituted on an aliphatic carbon atom within the polyol molecule. See for example U.S. Pat. Nos. 3,402,169 and 3,726,855.

It has recently been discovered that halogenated polyols, such as those referred to above, exert a detrimental effect on the catalytic activity of amine catalysts. Thus when brought in contact with such polyols, the amines become catalytically less active, the reduction in activity becoming more pronounced on prolonged contact. This phenomenon, the chemical nature of which is not yet fully understood, manifests itself particularly in those applications wherein the amine catalyst is preparatorily blended in with the halogenated polyol and the blend is stored or shipped as such for eventual use in polyurethane foam production.

In accordance with the invention, it has now been found that certain sulfur-containing organotin compounds exert a highly beneficial effect in retarding or minimizing the deterioration of amine catalysts in the presence of halogenated polyols. Thus pursuant to the invention, there is provided an improved catalytic polyol composition comprised of a halogenated polyol, an amine catalyst and a selected sulfur-containing organotin compound stabilizer, which composition can be used to advantage in the production of polyurethane foam.

As used in the specification and claims herein, the term "halogenated polyol" is intended to encompass any polyol containing at least one halogen atom substituted on an aliphatic carbon atom in the polyol molecule, the halogen being chlorine, bromine, or a mixture thereof. These polyols usually have 2–8 hydroxy groups and include polyether polyols, polyester polyols and mixtures thereof. However, the polyether polyols, including mixtures of halogenated and halogen-free polyether polyols, are preferred.

The polyether polyols include the halogenated oxyalkylated polyols. These may be prepared by a method generally well known in the art wherein a polyhydroxy compound is condensed, optionally in the presence of an oxyalkylation catalyst, with a halogenated alkylene oxide or a mixture of halogenated and halogen-free alkylene oxides using random or step-wise addition. U.S. Pat. No. 3,402,169, issued Sept. 17, 1969, to D. R. Jackson, provides a detailed description of this method. The entire disclosure of this Jackson patent is incorporated herein by reference.

In preparing the halogenated polyether polyols, any polyhydroxy compound, including mixtures of such compounds and alkylene oxide condensates thereof, may be employed which contains 2–8 hydroxy groups and is suitable for reaction with an alkylene oxide to form a polyether. Thus a wide range of polyhydroxy compounds is contemplated for use in preparing the halogenated polyether polyols. For illustration, the polyhydroxy compounds include ethylene glycol, propylene glycol, isobutylene glycol, 2,3-butanediol, 1,4-dihydroxy-2-butane, 1,4-dihydroxycyclohexane, 2-butyne-1,4-diol, 1,12-dihydroxyoctadecane, glycerin, trimethylolpropane, sorbitol, mannitol, inositol, erythritol, pentaerythritol, sucrose, dextrose, methyl glucoside, 1,4-dimethylolbenzene, glycerin monochlorohydrin, diglycerol, methyl ether of glycerin, mixtures thereof, and condensates thereof with alkylene oxide, e.g., ethylene oxide, propylene oxide and butylene oxide.

The polyhydroxy compounds also include, as a preferred group, the carbohydrate-based materials, particularly dextrose- and sucrose-based materials. As used in the specification and claims herein, the term "dextrose-based material," means one of the following: a mixture of dextrose and water, an oxyalkylated mixture of dextrose and water, a mixture of dextrose and an aliphatic polyhydric alcohol, an oxyalkylated mixture of dextrose and an aliphatic polyhydric alcohol, a mixture of dextrose, water, and an aliphatic polyhydric alcohol, or an oxyalkylated mixture of dextrose, water and an aliphatic polyhydric alcohol. The dextrose may be anhydrous such as d-glucose or hydrous such as $\alpha$-d-glucose monohydrate. By the same token, the term "sucrose-based material" means one of the following: a mixture of sucrose and water, an oxyalkylated mixture of sucrose and water, a mixture of sucrose and an aliphatic polyhydric alcohol, an oxyalkylated mixture of sucrose and an aliphatic polyhydric alcohol, a mixture of sucrose, water, and an aliphatic polyhydric alcohol, or an oxyalkylated mixture of sucrose, water, and an aliphatic polyhydric alcohol. Illustrative aliphatic polyhydric alcohols which may be used in preparing the dextrose- and sucrose-based materials include, for example, the aliphatic diols and triols such as ethylene glycol, propylene glycol, glycerol, trimethylolpropane, mixtures thereof and the like. The dextrose-based materials, particularly mixtures of dextrose and an aliphatic diol or triol, are especially preferred for use in preparing halogenated polyether polyols which are employed in the composition of the invention.

Any suitable molar ratio of water and/or aliphatic polyhydric alcohol to dextrose or sucrose may be used in preparing the dextrose- and sucrose-based materials referred to above. It is generally preferred, however, to employ at least about 0.7, and more preferably about 0.9–4 moles each of water and/or aliphatic polyhydric alcohol per each mole of dextrose or sucrose. A more detailed description regarding the preparation of the dextrose- and sucrose-based materials is provided in U.S. Pat. No. 3,741,921, which issued to M. Lapkin on June 26, 1973. The entire disclosure of this patent is incorporated herein by reference.

In preparing the halogenated polyether polyol, any alkylene oxide, or mixture thereof, may be used which has one or more halogen atoms substituted on an aliphatic carbon atom, the halogen being chlorine, bromine or a mixture thereof, and which alkylene oxide is capable of reacting with a polyhydroxy compound to form a polyether polyol. If desired, a mixture of a halogen-substituted and a halogen-free alkylene oxide may be used. The halogen-substituted alkylene oxides usually contain an epoxide ring and have from 2–4 carbon atoms. Preferred among them are the vicinal epoxides, particularly those having 3–4 carbon atoms. It is also preferred that the halogen-substituted alkylene oxide contain at least 2 halogens. Representatives of these include 3,3-dichloro-1,2-epoxypropane; 3,3-dibromo-1,2-epoxypropane; 3,3,3-trichloro-1,2-epoxypropane; 4,4,4-trichloro-1,2-epoxybutane; 4,4,4-tribromo-1,2-epoxybutane; 4,4,3,3-pentachloro-1,2-epoxybutane; 1,1,1,4,4-pentachloro-2,3-epoxybutane; and mixtures thereof. The most preferred such halogenated alkylene oxides are those having three halogens in the molecule, the halogen being chlorine, such as 4,4,4-trichloro-1,2-epoxybutane.

Any suitable oxyalkylation catalyst may be employed to promote the reaction of the polyhydroxy compound with the halogenated alkylene oxide. This includes basic catalysts, such as sodium hydroxide and potassium hydroxide, and acid catalysts, such as boron trifluoride and the etherate derivatives thereof. The latter catalysts are preferably employed in preparing polyether polyols which are derived from carbohydrate-based polyhydroxy compounds.

As is well known in the art, the relative proportion of alkylene oxide, or mixture of alkylene oxides, which is used depends on the hydroxyl number which is desired in the polyether polyol product. In accordance with the preferred embodiments of the invention, a sufficient proportion of halogenated alkylene oxide or mixture thereof is employed to yield a halogenated polyether polyol having a hydroxyl number of about 100–800, more preferably about 200–700, and still more preferably about 250–650. It is also preferred to employ such a proportion of halogenated alkylene oxide as to yield a halogen content in the polyether polyol of no less than about 15%, more preferably about 20–80%, and still more preferably about 25–60% by weight.

The amine catalyst which is stabilized according to the invention can be any amine that acts as a promoter for the reaction of an organic polyisocyanate with a polyol to form a polyurethane. However, the preferred amine catalysts are the conventional alkyl tertiary amines. As used in the specification and claims herein, the term "alkyl tertiary amine" is intended to include any such amines, and mixtures thereof, including mono- and diamines. Illustrative are the aliphatic tertiary mono- and diamines, the cycloaliphatic tertiary amines and the tertiary aminoalkanols. All of these tertiary amines usually contain 3–10, and preferably 4–8, carbon atoms.

Exemplificative of the aliphatic tertiary amines are the trialkylmonoamines such as trimethylamine and triethylamine, the trialkylene diamines such as triethylene diamine, and the N,N,N',N'-tetraalkylalkylene diamines such as N,N,N',N'-tetramethyl butylene diamine. The cycloaliphatic tertiary amines are exemplified by the dialkylcyclohexylamines such as dimethylcyclohexylamine and diethylcyclohexylamine; and the tertiary aminoalkanols are exemplified by the dialkyl alkanolamines, such as dimethylethanolamine and dimethylpropanolamine, the alkyl dialkanolamines such as methyldiethanolamine and methyldipropanolamine, and the trialkanolamines such as trimethanolamine, triethanolamine, diethanolpropanolamine, and tripropanolamine.

The most preferred tertiary amine catalysts for use in the composition of the invention are triethylene diamine, dimethylcyclohexylamine, N,N,N',N'-tetramethyl butylene diamine, and triethanolamine.

Any suitable proportion of the amine which is effective in catalyzing the reaction of the halogenated polyol with organic isocyanates may be employed in the composition of the invention. Thus catalytic proportions are usually used such about 0.02–5.0, preferably about 0.05–3.0, and more preferably about 0.075–2.0 parts per every 100 parts by weight of the halogenated polyol.

Pursuant to the invention, a sulfur-containing, organotin compound is used as the amine catalyst stabilizer. It is contemplated that any such compound, which is effective in stabilizing the amine catalyst may be employed. This includes the tetravalent tin mercapto compounds, e.g., the dialkyl tin mercaptides and the dialkyltin mercaptocarboxy esters, such as disclosed for example, in A. K. Sawyer, Organotin Compounds, Vol. 2, Marcel Dekker, Inc., New York, 1971. The entire disclosure of this reference is incorporated herein by reference. The dialkyltin mercaptocarboxy esters are preferred as a group, and they include compounds represented by formula I as follows:

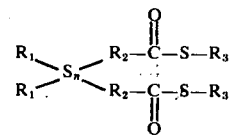

wherein
R₁ is an alkyl group of 1–8, and preferably 1–4, carbon atoms,
R₂ is an alkylene group of 1–8 carbon atoms, and
R₃ is an alkyl group of 1–8 carbon atoms.

Illustrative dialkyltin mercaptocarboxy esters as represented by formula I include
dimethyltin bismethylmercaptoacetate
diethyltin bismethylmercaptoacetate
dibutyltin bismethylmercaptoacetate
dimethyltin bismethylmercaptopropionate
diethyltin bisethylmercaptobutyrate
dipropyltin bisisobutylmercaptoacetate
dimethyltin bisisooctylmercaptoacetate
dihexyltin bisethylmercaptopropionate A particularly preferred group of dialkyltin mercaptocarboxy esters for use according to the invention is the dimethyltin bisalkylmercaptoacetates in which the alkyl group contains 1–8 carbon atoms, e.g., methyl, ethyl, propyl, butyl, hexyl, isooctyl etc., such as dimethyltin bisisooctylmercaptoacetate.

The sulfur-containing organotin compound may be used in any suitable proportion which is effective in stabilizing or preserving the catalytic activity of the amine catalyst. Thus a stabilizing proportion is employed. Illustratively, such a proportion may range from about 0.01 to about 6 parts per part by weight of the amine catalyst. A preferred proportion is about 0.04–5, and still more preferably about 0.04–1 parts per each part by weight of the amine catalyst.

Any suitable order of addition may be employed in preparing the catalytically stable polyol composition of the invention. For example, the sulfur-containing organotin compound may first be added to, and mixed with, the amine catalyst, the mixture being thereafter added to, and blended with, the halogenated polyol. Alternatively, the sulfur-containing organotin compound may be separately added to, and blended with the halogenated polyol prior to, or concurrently with, the addition of the amine catalyst. If desired, the polyol composition of the invention may incorporate additional ingredients, such as blowing agents, surfactants and so forth, which serve certain functions in connection with the use of the polyol in making polyurethane foam.

The halogenated polyol composition described herein is utilized, according to the process of the invention, in the preparation of polyurethane foam. To this end, it is reacted with an organic polyisocyanate in the presence of a foaming agent. Conventional techniques, such as the one-shot method or the prepolymer technique, are employed in carrying out the foam forming reaction. The organic polyisocyanate reactant can be any such material, or mixture thereof, which is suitable for reaction with a polyol to form a polyurethane. Illustrative are toluene diisocyanate, such as the 80/20 mixture of 2,4-/2,6-isomers, polymethylene polyphenylisocyanate, mixtures thereof and the like. Usually a sufficient proportion of polyisocyanate is employed such as to provide at least about 0.8, and preferably about 0.9–1.2, NCO groups per each OH group in the foam forming reaction mixture.

The foaming agent employed in preparing the polyurethane foams of the invention can be any one of those known in the art to be useful for this purpose such as water, the halogenated hydrocarbons, and mixtures thereof. The preferred foaming agents are the halogenated hydrocarbons which include, for example, monofluorotrichloromethane, difluorodichloromethane, the trichlorotrifluoroethanes, dichlorotetrafluoroethane, methylene chloride, chloroform, carbon tetrachloride, and the like. The amount of foaming agent, or mixture of foaming agents, can be varied over a wide range. Generally, however, the halogenated hydrocarbons are employed in an amount ranging from about 1 to about 75 parts by weight per 100 parts of total polyols in the foam-forming reaction system; and generally water is employed in an amount ranging from about 0.1 to about 10 parts by weight per 100 parts of total polyols.

It is preferred in the preparation of the polyurethane foam according to the invention to employ minor amounts of a conventional polyurethane foam surfactant. Typical of these are the silicon-based surfactants such as the silicone oils and soaps and the siloxanes. Usually the amount of surfactant ranges up to about 2 parts by weight per 100 parts of total polyols in the reaction system.

Various additives may also be incorporated in the polyurethane foam-forming reaction mixture, if desired, such as fillers, dyes, plasticizers, deodorants, and antioxidants.

The invention disclosed herein provides an easy and simple route for minimizing the problem of catalyst inactivation resulting from contact with a halogenated polyol. Thus a halogenated polyol composition is prepared, for use in the production of flame retardant polyurethane foam, which comprises an amine catalyst, the activity of which catalyst is not subject to substantial deterioration upon storage or during transport. Such a composition is of particular utility in those applications, e.g., the on-site generation of polyurethane foam, wherein the foam-forming ingredients are supplied from two containers, one container providing the organic isocyanate reactant and the other container providing the polyol reactant along with an amine catalyst and a foaming agent.

The following examples are provided to illustrate the invention. In these examples, all parts and percentages are by weight unless otherwise specified.

EXAMPLE 1

A polyether polyol composition was prepared by mixing together one part of dimethylcyclohexylamine, 0.1 part of dimethyltin bisisooctylmercaptoacetate and 100 parts of a chlorinated polyether polyol having a hydroxyl number of 360. The latter had been prepared by condensing, in the presence of boron trifluoride etherate, 4,4,4-trichloro-1,2-epoxybutane with an equimolar mixture of ethylene glycol and α-d-glucose monohydrate.

The above composition was used to prepare a rigid polyurethane foam using the following ingredients in the indicated proportions:

| Ingredients | Parts by Weight |
| --- | --- |
| Polyol composition | 101.1 |
| Polymethylene polyphenylisocyanate[1] | 104.0 |
| Polydimethylsiloxane surfactant[2] | 2.0 |
| Trichlorofluoromethane foaming agent | 31.0 |

[1]This material, purchased commercially from the Upjohn Company under the trademark "PAPI", has an approximate functionability of 3.
[2]This is conventionally used foam surfactant, product of Union Carbide, purchased under the trademark "L-5410"

The above ingredients were mixed together and foamed in a square cardboard box. Using a stop-watch, the "cream time" and the "tack-free time" were measured, both time measurements being made from the moment the mixture is placed in the cardboard box. The "cream time" is the time elapsed up to the point when foaming commences, during which time the mixture is transformed from a liquid to a cream or emulsion. The "tack-free time" is the minimum time elapsed after which the foam ceases to be tacky. The results of the two measurements were as follows:
Cream Time: —16 seconds
Tack-Free Time: —70 seconds Comparison 1

For purposes of comparison, the procedure of Example 1 was followed with two exceptions. One is that no dimethyltin bisisooctylmercaptoacetate was used in preparing the polyol composition used in this comparison. Secondly, instead of one part by weight of dimethylcyclohexylamine catalyst, as used in preparing the polyol composition of Example 1, 1.5 parts were used in this comparison. The cream time and tack-free time characterizing the foaming reaction are given below:
Cream Time: —26 seconds
Tack-Free Time: —140 seconds The results of this comparison, when viewed in light of the results of Example 1, demonstrate substantial reduction in amine catalyst activity which results, in the absence of a catalyst stabilizer as taught herein, from a brief contact of the catalyst with the halogenated polyol. Thus in the absence of the very small proportion of dimethyltin bisisooctylmercaptoacetate, as used in Example 1, the foaming reaction time parameters are almost doubled even though a higher proportion of amine catalyst is used.

EXAMPLE 2

The exact procedure of Example 1 was followed with one exception. This is that the polyol composition was stored at room temperature for 150 days before being used in foam preparation. The foaming reaction cream time and tack-free time were clocked. The results, which are given below, indicate only minor reduction in catalyst activity resulting from the extended storage.
Cream Time: —30 seconds
Tack-Free Time: —85 seconds

Comparison 2

The purpose of this comparison is to demonstrate the markedly increased rate of catalyst inactivation which results upon storage in the absence of a dialkyltin mercaptide. Thus the same procedure of Example 2 was followed with these modifications. First, no dimethyltin bisisooctylmercaptoacetate was used in preparing the polyol composition and instead of 1 part, 1.5 parts of the dimethyl cyclohexylamine catalyst were used. Secondly, the polyol composition was stored for only 92 days as opposed to the 150 days storage period of Example 2. Nevertheless, as indicated below, the foaming reaction cream time and tack-free time were more than double the values obtained in Example 2.
Cream Time: —65 seconds
Tack-Free Time: —265 seconds

What is claimed is:

1. A catalytically stable polyol composition, for use in the preparation of polyurethane foam, which comprises a halogenated polyol, a tertiary alkyl amine catalyst, and a catalyst stabilizing proportion of a dimethyltin bisalkylmercaptoacetate in which the alkyl group contains from 1 to 8 carbon atoms.

2. The composition of claim 1 wherein dimethyltin bisisooctylmercaptoacetate is employed.

3. The composition of claim 1 wherein said alkyl tertiary amine is selected from the group consisting of triethylene diamine, dimethylcyclohexylamine, N,N,N',N'-dimethyl butylene diamine, and triethanolamine.

4. The composition of claim 3 wherein dimethyltin bisisooctylmercaptoacetate is employed.

5. The composition of claim 1 wherein said polyol is a polyether polyol which is the product of condensing a polyhydroxy compound having 2–8 hydroxy groups with a halogenated alkylene oxide.

6. The composition of claim 5 wherein said polyhydroxy compound is a dextrose-based material or a sucrose-based material and said polyol has a hydroxyl number of about 250–650.

7. The composition of claim 6 wherein said halogenated alkylene oxide contains 3–4 carbon atoms and at least two halogens in the molecule.

8. The composition of claim 7 wherein said halogenated alkylene oxide is 4,4,4-trichloro-1,2-epoxybutane.

9. The composition of claim 8 wherein said polyhydroxy compound is a dextrose-based material.

10. The composition of claim 9 wherein said alkyl tertiary amine contains 3–10 carbon atoms and is selected from the group consisting of a trialkylmonoamine, a trialkylene diamine, a N,N,N',N'-tetraalkyl alkylene diamine, a dialkylcyclohexylamine, a dialkyl alkanolamine, an alkyl dialkanolamine, and a trialkanolamine.

11. The composition of claim 10 wherein said trialkylmonoamine is trimethylamine or triethylamine, said trialkylene diamine is triethylene diamine, said N,N,N',N'-tetraalkyl alkylene diamine is tetramethyl butylene diamine, said dialkylcyclohexylamine is dimethylcyclohexylamine or diethylcyclohexylamine, said dialkyl alkanolamine is dimethylethanolamine or dimethylpropanolamine, said alkyl dialkanolamine is methyl diethanolamine or methyl dipropanolamine, and said trialkanolamine is trimethanolamine, diethanolpropanolamine, and tripropanolamine.

12. The composition of claim 11 wherein said dextrose-based material is a mixture of dextrose and an aliphatic diol or an aliphatic triol.

13. The composition of claim 12 wherein said dextrose-based material is a mixture of dextrose with ethylene glycol, propylene glycol, glycerol, trimethylolpropane or a mixture thereof.

14. The composition of claim 13 wherein said alkyl tertiary amine is selected from the group consisting of triethylenediamine, dimethylcyclohexylamine, N,N,N',N'-tetramethyl butylene diamine and triethanolamine.

15. The composition of claim 14 wherein dimethyltin bisisooctylmercaptoacetate is employed.

16. The composition of claim 15 wherein said dextrose-based material is a mixture of dextrose and ethylene glycol.

17. The composition of claim 16 wherein said halogenated polyol is prepared by condensing, in the presence of boron trifluoride or an etherate derivative thereof, said 4,4,4-trichloro-1,2-epoxybutane with a mixture of about 1 mole of d-glucose monohydrate per mole of said ethylene glycol.

\* \* \* \* \*

UNITED STATES PATENT OFFICE
CERTIFICATE OF CORRECTION

Patent No. 3,980,579     Dated September 14, 1976

Inventor(s) Allan H. Syrop and Peter P. Priga

It is certified that error appears in the above-identified patent and that said Letters Patent are hereby corrected as shown below:

Column 4, following Line 27, the corrected formula should read:

- - -

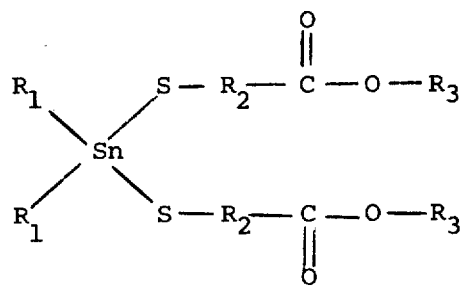

- - -

Signed and Sealed this

Twenty-ninth Day of March 1977

[SEAL]

Attest:

RUTH C. MASON
*Attesting Officer*

C. MARSHALL DANN
*Commissioner of Patents and Trademarks*